United States Patent [19]

Byers

[11] 3,781,488

[45] Dec. 25, 1973

[54] PLAYBACK SYSTEM WITH FREQUENCY EQUALIZATION BY CASCADED CIRCUITS PERFORMING IN ACCORDANCE WITH PARTIAL FRACTION EXPANSIONS OF FACTORIAL EQUALIZING FUNCTION TERMS

[75] Inventor: Robert A. Byers, Altadena, Calif.

[73] Assignee: Bell & Howell Company, Chicago, Ill.

[22] Filed: June 22, 1971

[21] Appl. No.: 155,564

[52] U.S. Cl. .......... 179/100.2 K

[51] Int. Cl. .......... G11b 5/44

[58] Field of Search .......... 179/100.2 K

[56] References Cited

UNITED STATES PATENTS

| | | | |
|---|---|---|---|
| 3,631,365 | 12/1971 | Dolby | 179/100.2 K |
| 3,293,364 | 12/1966 | Richter | 179/100.2 K |
| 3,048,664 | 8/1962 | Drukey | 179/100.2 K |
| 3,316,360 | 4/1967 | Coleman et al. | 179/100.2 K |

OTHER PUBLICATIONS

Haynes, N.M.; Transistor Circuits For Magnetic Recording; Bobbs-Merrill Co., Inc., N.Y.; 1964; p. 141–162, 171–176, 278–283.

*Primary Examiner*—Terrell W. Fears
*Assistant Examiner*—Robert S. Tupper
*Attorney*—Luc P. Benoit

[57] ABSTRACT

Non-linear frequency response of a recorded signal playback system is equalized with the aid of an equalizing function. This function is analyzed into a number of factorial terms. A partial fraction expansion is performed on each term. A number of cascaded electric circuits is provided for performing the equalizing function on played-back electric signals. The cascaded circuits include for each factorial term an electric circuit for performing in accordance with the particular partial fraction expansion a function conforming to the particular term. The played-back electric signals are subjected to the cascaded circuits to equalize the non-linear frequency response of the playback system.

The playback system may be a multi-speed playback system, in which case one of the function-performing circuits is adjusted for each speed of the playback system to adapt the equalization to the particular speed.

19 Claims, 6 Drawing Figures

INVENTOR.
ROBERT A. BYERS
BY Luc P. Benoit
ATTORNEY.

PLAYBACK SYSTEM WITH FREQUENCY EQUALIZATION BY CASCADED CIRCUITS PERFORMING IN ACCORDANCE WITH PARTIAL FRACTION EXPANSIONS OF FACTORIAL EQUALIZING FUNCTION TERMS

BACKGROUND OF THE INVENTION

1. Field of the Invention

The subject invention relates to the playback of recorded information and, more particularly, to the equalization of non-linear frequency responses of information playback systems.

2. Description of the Prior Art

It is well known that the frequency response of recorded information playback systems is typically nonlinear. A linear or approximately linear frequency response is, however, important in many areas so that it has become customary to attempt an equalization of the non-linear frequency response.

A common industry practice has been to synthesize an impedance having the desired frequency characteristics and to use that impedance in a feedback loop or as the driving point impedance for a current source. This approach typically requires several adjustments which are often interacting to provide adequate equalization. The adjustment procedure is time-consuming and requires considerable skill and experience on the part of the operator. All these problems are compounded in the case of multi-speed playback systems in which the equalization function has to be adapted to each playback speed and individually adjusted for each playback speed.

SUMMARY OF THE INVENTION

The subject invention overcomes or materially alleviates the above-mentioned prior-art disadvantages.

It is broadly an object of the subject invention to provide for the equalization of non-linear frequency responses of playback systems.

It is a further object of the subject invention to provide for the equalization of non-linear frequency responses in playback systems that operate at different playback speeds.

It is a further object of the subject invention to provide for the equalization of non-linear frequency responses of multi-speed playback systems with the aid of a minimum number of adjustments per playback speed.

It is a further object of the invention to provide apparatus for playing back recorded signals and equalizing non-linear frequency responses of the playback with the aid of an equalizing function.

It is yet another object of the invention to provide apparatus for playing back recorded signals at different playback speeds and for equalizing for each playback speed non-linear frequency responses with the aid of an equalizing function that is adapted to each playback speed with a minimum number of adjustments.

These and other objects will become more fully apparent as this disclosure proceeds.

From one aspect thereof, the subject invention resides in a method of equalizing a non-linear frequency response of a recorded signal playback system, comprising, in combination, the steps of providing an equalizing function for an equalization of the non-linear frequency response, analyzing the equalizing function into a number of factorial terms, performing a partial fraction expansion for each term, providing for each of the factorial terms a means for performing in accordance with the particular partial fraction expansion a function conforming to the particular factorial term, cascading the number of means so provided, playing back with the playback system the recorded signal as a corresponding electric signal, and subjecting the played-back electric signal to the cascaded number of means whereby to equalize the non-linear frequency response.

The expression "factorial terms" as herein employed refers to terms which will provide the desired equalizing function upon multiplication thereof.

Where the playback system is a multi-speed playback system, parameters of the function-performing means are switched for each speed of the playback system too adapt the equalization of the non-linear frequency response to the particular speed.

From another aspect thereof, the subject invention resides in apparatus for playing back recorded signals and equalizing a non-linear frequency response of the playback with the aid of an equalizing function for an equalization of the non-linear frequency response. The invention according to this aspect resides, more specifically, in the improvement comprising, in combination, means for playing back the recorded signals in the form of corresponding electric signals, a number of cascaded means for performing the equalizing function on the electric signals, with the number of cascaded means including first means for performing on the electric signals a function conforming to a first factorial term of said equalizing function, and second means connected in cascade with the first means for performing a function conforming to a second factorial term of said equalizing function, said first means including third means for performing on said electric signals a function conforming to a first term of a partial fractional expansion of said first factorial term, and fourth means connected to said third means for performing on said electric signals a function conforming to a second term of said partial fractional expansion of said first factorial term, and said second means including fifth means for performing a function conforming to a first term of a partial fractional expansion of said second factorial term, and sixth means connected to said fifth means for performing a function conforming to a second term of said partial fractional expansion of said second factorial term, and means connected between the playback means and the number of cascaded means for applying the played-back electric signals to the number of cascaded means whereby the non-linear frequency response is equalized.

The playback means may include multi-speed playback means for playing back recorded signals in the form of corresponding electric signals at different playback speeds, and the first and second means may include selectively actuable means for adapting the equalization of the non-linear frequency response to each playback speed.

The performance of the above mentioned partial fraction expansions on factorial terms of the equalizing function is an essential feature of the invention, since it permits realization of the equalizing function with simple circuit means that are non-interacting in their adjustments. This is particularly important in multi-speed embodiments.

BRIEF DESCRIPTION OF THE DRAWINGS

The invention will become more readily apparent from the following detailed description of preferred embodiments thereof, illustrated by way of example in the accompanying drawings, in which.

DESCRIPTION OF PREFERRED EMBODIMENTS

Figures 1, 4:
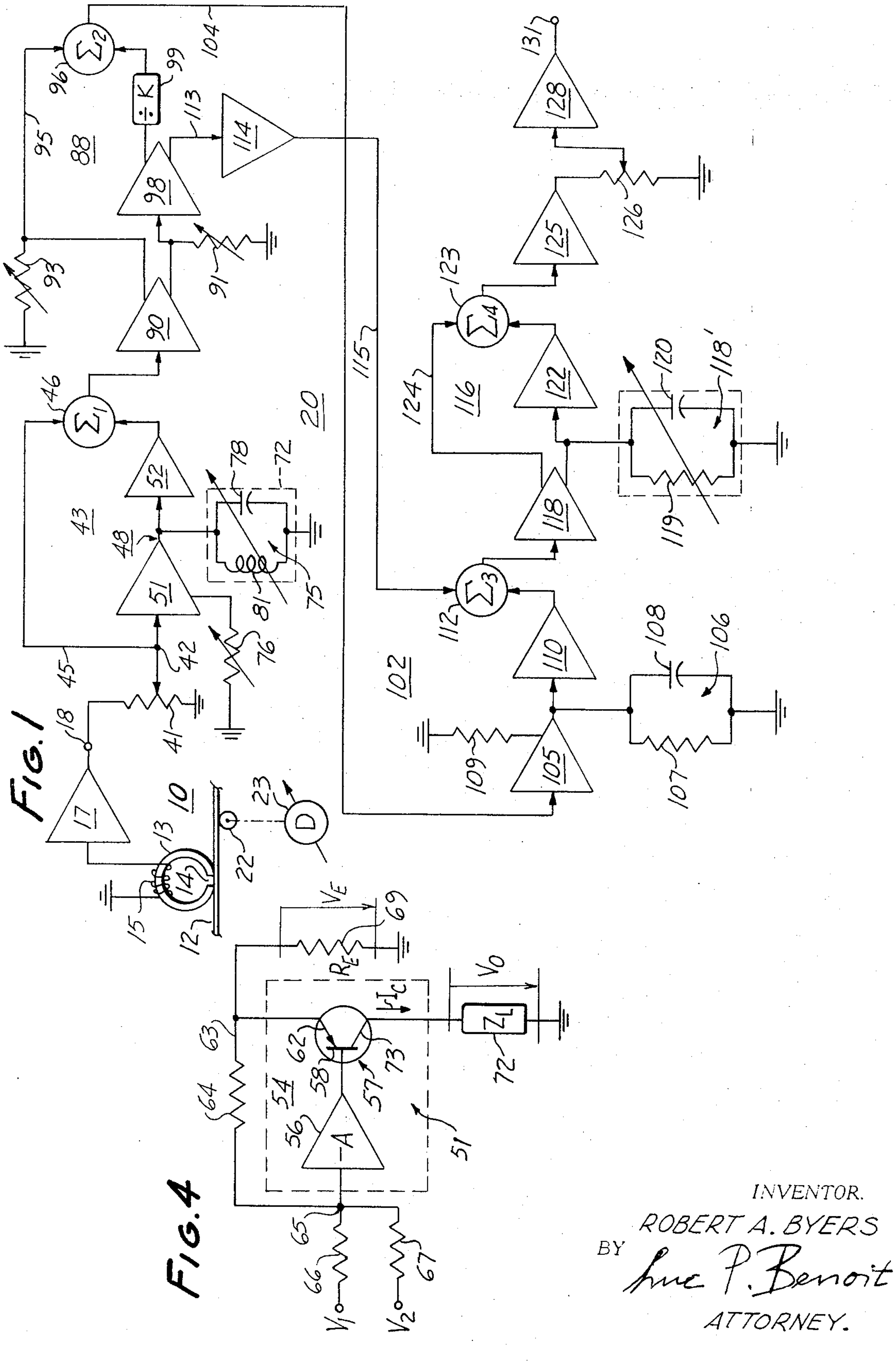
FIG. 1 is both a block diagram of a playback apparatus and a flow sheet of a playback method in accordance with a preferred embodiment of the subject invention.
FIG. 4 is a schematic of a transconductance-summing amplifier that may be used in the practice of the method, or in the implementation of the apparatus, of FIG. 1, in accordance with a preferred embodiment of the subject invention.

By way of example, and not by way of limitation, the playback system 10 of FIG. 1 is a system for playing back magnetically recorded information from a magnetic recording tape 12. The illustrated system 10 is of a direct reproduce type. This implies that the information was recorded on the magnetic tape 12 by a direct recorder. Direct recording is a well-known technique which is characterized by a recording of information directly on the recording medium, as distinguished from an amplitude or time modulation of the information and a subsequent recording of the modulated information.

Direct recording systems are well known and, in their magnetic tape recording versions, utilize the conventional high-frequency recording bias for improving the quality of the recorded signal. Direct reproduce playback systems are also well known in the art. As diagrammatically shown in FIG. 1, their magnetic versions include a magnetic playback head 13 having an air gap 14 for picking up the magnetically recorded information and having a head winding 15 for reproducing an electric signal corresponding substantially to the picked-up magnetically recorded signal. The reproduced electric signal is applied to a conventional high-quality preamplifier 17 which applies the preamplified reproduced information signal to an input 18 of the equalizer 20.

Playback from the tape 12 is effected in a conventional manner by advancing the tape past the air gap 14 of the playback head 13 with the aid of a capstan 22 which engages the tape 12 and which is rotated by a multi-speed tape drive 23. Multi-speed recording and playback systems are well known in the art. While their utility is not limited to any one application, such systems have found particularly widespread application in the instrumentation tape recording field where operation at different speeds commencing in the sub-inch range and reaching into the above-100-inch range are frequently required. By way of example, a prototype of the preferred embodiment shown in FIGS. 5*a* and *b* has been designed for different tape speeds ranging from 15/16 inches per second to 240 inches per second.

The reproduce head preamplifier 17 may be of a conventional differential type, in which case the head winding 15 is duplicated so that it has a grounded center tap.

Figure 2:
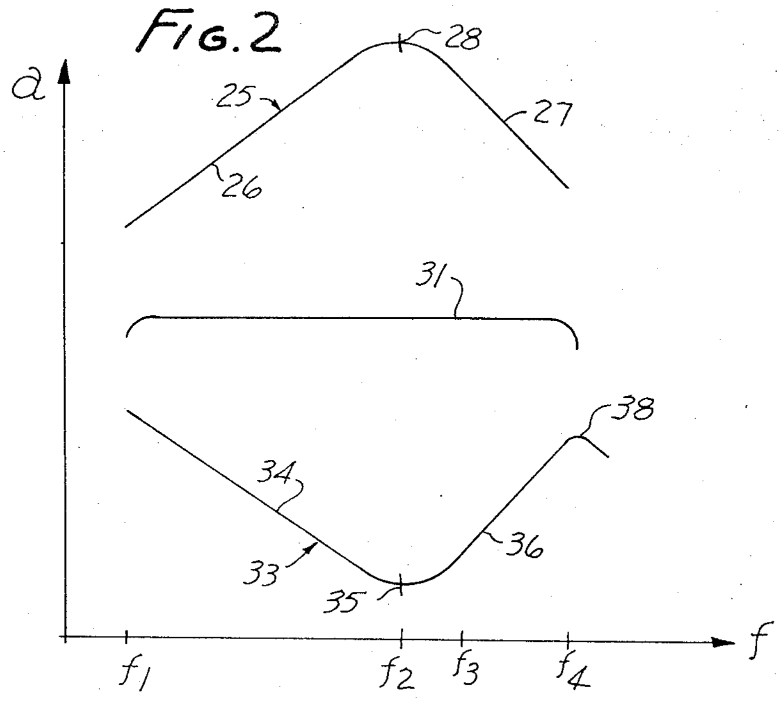
FIG. 2 is an amplitude-versus-frequency plot illustrating a basic function of the method or apparatus of FIG. 1.

As is well known in the art, the amplitude-versus-frequency response of direct-reproduce playback systems typically is non-linear. A representative response curve 25 is shown in FIG. 2. The response curve 25 has a branch 26 which extends from the low-frequency to the mid-frequency domain and which is typically ascending at a rate of 6 decibels per octave due to increasing flux rate of change in the recording head 13 as recorded information of increasing frequency passes the air gap 14.

The response curve 25 has an upper branch 27 which declines from a peak 28 in the mid-frequency domain to a relatively low value in the high-frequency domain. The declining nature of the branch 27 is mainly due to head losses with increasing frequency.

The non-linear frequency response of the playback is, of course, very undesirable in practice, since it severely distorts the desired fidelity of the recorded and reproduced information or signal. A desired linear system response is depicted by the curve 31 in FIG. 2. In a recording and playback system obeying the curve 31, practically every frequency component of the recorded and played-back signal has the same amplitude upon playback as upon recording, assuming proper phase equalization of the type disclosed below.

A linear response of the type shown at 31 can be achieved or reasonably approximated by a frequency response of the reproduce amplifier which is complementary to the curve 25. A suitable complementary frequency response curve 33 is shown in FIG. 2. The curve 33 has a branch 31 which corresponds to the branch 26 of the curve 25. Where the branch 26 ascends at a rate of 6 decibels per octave, the branch 34 or the curve 33 descends at 6 decibels per octave. Moreover, the curve 33 has a minimum amplitude point 35 in the mid-frequency area, which corresponds to the maximum amplitude point 28 of the curve 25. The curve 33 further has an ascending branch 36 which is complementary to the descending branch 27 of the curve 25. The branch 36 extends from the mid-frequency to the high-frequency domain, and peaks at the upper frequency edge as shown at 38.

While the realization of the complementary response 33 is of itself a formidable task, the problem is greatly compounded in multi-speed recording and playback systems.

For example, since the head losses represented by the branch 27 of the curve 25 in FIG. 2 increase as a function of frequency, the steepness of the branch 36 of the complementary curve 34 has to be increased with increasing tape speed. A similar adjustment has to be effected with respect to the mid-frequency minimum response 35 of the complementary curve 34, since the amplitude of the peak frequency region 28 increases with increasing tape speed and also varies its position in terms of frequency. In practice, it would also be desirable to compensate for the differentiating effect of the flux rate of change at different tape speeds in the low-frequency area. Moreover, a phase equalization in the playback process is highly desirable, especially where the amplitude equalization circuits introduce phase shifts into the reproduced signal.

The illustrated preferred embodiments of the subject invention effect a frequency response equalization in all of the several respects outlined in the preceding paragraph. This is best apparent from the following mathematical analysis of the operation of the illustrated preferred embodiments.

As known to persons skilled in theoretical and design aspects of the magnetic tape recording art, a curve of the type of curve 25, and a curve of the type of complementary curve 34, in FIG. 2, can be expressed or can be reasonably approximated in mathematical terms. Techniques for accomplishing such mathematical expression are well-known per se and have for many years been used in such conventional areas as filter and amplifier design in telecommunication or recording-reproducing systems.

By using computer analysis, verifying experiment, and known information, a person of ordinary skill is capable of arriving at a mathematical expression for the equalizing function, expressed mainly in terms of the lower band edge frequency $f_1$, the minimum amplitude frequency $f_2$ and the upper band edge frequency $f_4$ (see FIG. 2). In the following equations, the frequencies $f$, $f_1$, $f_2$, and $f_4$ are replaced by their angular-frequency counterparts.

A suitable equalizing function for the non-linear frequency response of the playback system has been determined in the above mentioned manner as $$H(j\omega) = K\,[\omega_1(\omega_2+j\omega)\,(\omega 4^2 - \omega^2+2jd_2\omega\omega_4)/\omega_2(\omega_1+j\omega)\,(\omega_4^2 - \omega^2+2jd_1\omega\omega_4)] \quad (1)$$

wherein $\omega$ is the angular frequency of the played-back signal;

$\omega_1$ is the angular lower band edge frequency;

$\omega_2$ is the angular minimum amplitude frequency (corresponding to $f_2$);

$\omega_4$ is the angular upper band edge frequency;

K is a gain constant;

$d_1$ is a first damping constant;

$d_2$ is a second damping constant; and $j$ is the imaginary unit.

The equation (1) is analyzed or broken down into the following two factors or factorial terms:

$$A_1(j\omega) = K\,[\omega_1/\omega_2][(\omega_2+j\omega)/(\omega_1+j\omega)] \quad (2)$$

and $$A_2(j\omega) = (\omega_4^2 - \omega^2+2jd_2\omega\omega_4/\omega_4^2 - \omega^2+2jd_1\omega\omega_4) \quad (3)$$

In accordance with the subject invention, the factorial terms (2) and (3) are subjected to partial fraction expansion to provide, respectively:

$$A_1(j\omega) = \frac{K}{j\dfrac{\omega}{\omega_1}+1} + K\,\frac{\omega_1}{\omega_2}\left[1 - \frac{1}{j\dfrac{\omega}{\omega_1}+1}\right] \quad (4)$$

and $$A_2(j\omega) = 1 + [j2(d_2 - d_1)\omega\omega_4/\omega_4^2 - \omega^2+j2d_1(\omega\omega_4)] \quad (5)$$

In accordance with an important feature of the subject invention, the functions (4) and (5) are easily performed by relatively simple circuits that require only a minimum of non-interacting adjustments for various playback speeds.

In accordance with the block diagram of FIG. 1, the preamplified played-back signal is applied through the input 18 of the equalizing amplifier to a level adjustment potentiometer 41. The wiper of the potentiometer 41 is connected to the input 42 of an amplifier circuit 43.

The amplifier circuit 43 performs on the preamplified played-back signal a function conforming to the factorial term expressed in the equation (5). The addend 1 in the equation (5) is provided by a lead 45 connected between the circuit input 42 and a summing point 46. The addend $$[j2(d_2 - d_1)\omega\omega_4/\omega_4^2 - \omega^2+j2d_1(\omega\omega_4)] \quad (6)$$

is performed by a branch 48 of the circuit 43, including amplifiers 51 and 52 connected in series between the circuit input 42 and the summing point 46, and including a tuned load 75.

A consideration of FIG. 4 may be helpful at this juncture. According to FIG. 4 the amplifier 51 in the circuit 43 comprises preferably a transconductance amplifier 54 that performs a summing function.

Figure 5A:
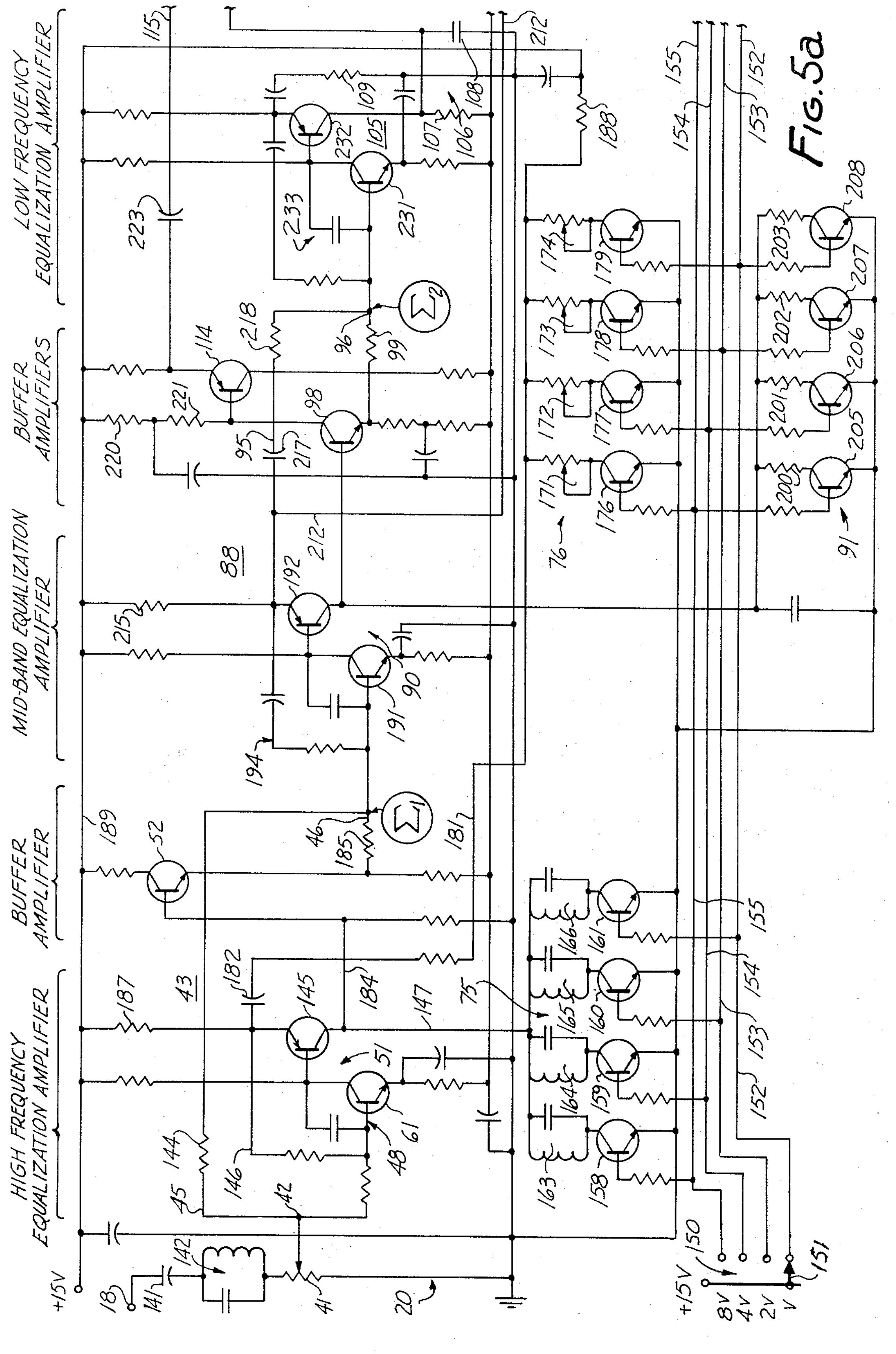
FIGS. 5*a* and 5*b* jointly constitute a circuit diagram of the apparatus of FIG. 1, in accordance with a preferred embodiment of the subject invention.

The transconductance amplifier 54 comprises a first amplifier 56 with a gain of −A and a transistor 57 having a base 58 connected to the output of amplifier 56. As seen in FIG. 5a at 61, the amplifier 56 may be composed of a single transistor stage.

The transistor 57 of the transconductance amplifier of FIG. 4 has an emitter 62 connected to a feedback circuit 63. The feedback circuit 63 has a feedback resistor 64 connected between the emitter 62 and a summing point 65. The summing point 65 receives input voltages $V_1$ and $V_2$ through summing resistors 66 and 67, respectively. The summing point 65 is connected to the input of the amplifier 56. A resistor 69 of a value of $R_E$ is connected between the emitter 62 and ground or, in other words, between the feedback circuit 63 and ground. A load impedance 72 of a value of $Z_L$ is connected between the collector 73 of the transistor 57 and ground.

The feedback circuit 63 is in a conventional manner dimensioned to provide a voltage of $V_E$ across the resistor 69 which corresponds to the sum of the input voltages $V_1$ and $V_2$ and which is substantially independent of the value of the resistor 69. This may be expressed in mathematical terms as follows:

$$V_E = -(V_1 + V_2) \quad (7)$$

In accordance with transconductance amplifier principles, the collector current $I_C$ of the transistor 57 is equal to:

$$I_C = (V_E/R_E) \quad (8)$$

The output voltage across the impedance 72 thus is:

$$V_0 = (V_1 + V_2/R_E)\,Z_L \quad (9)$$

In accordance with a preferred embodiment of the subject invention, the transfer function expressed in equation (6) is realized with the aid of impedances presented as loads to the transconductance amplifier 54. More specifically, the amplifier 51 in FIG. 1 is provided with an output load 72 comprising a variable resonant circuit 75.

The factor $d_1$ in the denominator of equation (6) may be expressed as $$d_1 = (1/2RC\omega_4) \quad (10)$$

wherein $\omega_4$ is the angular upper band edge frequency (see $f_4$ in FIG. 2);

$R$ is the parallel resistance of the resonant circuit 75; and $C$ is the capacitance of the capacitor 78 of the resonant circuit 75.

The factor $(d_2 - d_1)$ in the nominator of equation (6) can be expressed as follows:

$$(d_2 - d_1) = (1/2CR_E \sqrt{LC}) \quad (11)$$

wherein $C$ is the capacitance of the capacitor 78 of the resonant circuit 75;

$L$ is the value of the inductance 81 of the resonant circuit 75; and $R_E$ is the adjusted value of a gain adjustment resistor 76 (see FIG. 1) which corresponds to the resistor 69 shown in FIG. 4.

Figure 3:
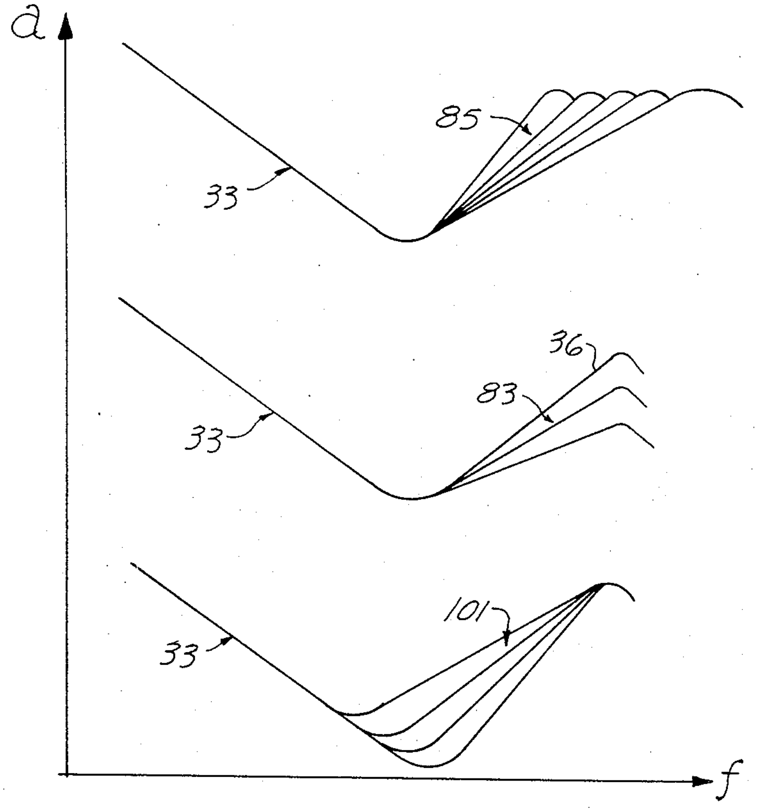
FIG. 3 is a family of curves in the nature of an amplitude-versus-frequency plot illustrating aspects of the playback speed adapting function of the method or apparatus of FIG. 1.

The operation of the gain adjustment resistor 76 by itself is illustrated by the family of curves 83 in the second equalization curve 33 from the bottom of FIG. 3. As shown by the family of curves 83, the variable resistor 76 serves to adjust the amplitude at the resonant point of the high-frequency branch 36.

The effect of the resonant circuit 72 is illustrated by the family of curves 85 in the top equalization curve 33 of FIG. 3. As shown by the family of curves 85, upper band edge peaking is switched by changing a parameter of the resonant circuit 75 for each playback speed.

The amplifier 52 connected between the resonant circuit 75 and the summing point 46 is a buffer amplifier, such as an emitter follower, for preventing a loading of the resonant circuit 75.

Practical tests on a prototype of the preferred embodiment of FIGS. 5a and b have confirmed that the amplifier circuit 43 satisfactorily performs the transfer function according to equation (5).

The amplifier circuits 88 and 102 shown in FIGS. 1 and 5a perform the transfer function set forth in equation (4). The amplifier circuit 88 is cascaded with the amplifier circuit 43 by way of the summing point 46.

The lower band edge frequency $f_1$ indicated in FIG. 2, and the corresponding angular frequency $\omega_1$ in equation (4), are substantially independent of tape speed. Analysis and practical experiments have indicated that the value of $\omega_2$ may be adapted to various tape speeds by changing the value of $\omega_2$ by a factor of two for each speed change. This is particularly workable for systems in which the value of each playback speed above the first speed is equal to twice the value of the next preceding playback speed.

The circuit 88 includes an amplifier 90 which may be of the type of transconductance amplifier 54 shown in FIG. 4 and described above.

A variable resistor 91, which corresponds to the load 72 shown in FIG. 4, is connected as a load resistor to the amplifier 90. A variable resistor 93, which corresponds to the previously described resistor 69 in FIG. 4, is connected to the feedback circuit (see 63 in FIG. 4) or to the emitter (see 62 in FIG. 4) of the last stage of the amplifier 90. The ratio of the value of the resistor 91 to the value of the resistor 93 determined the ratio of $K\,\omega_1/\omega_2$.

In practice, the value of resistor 91 can be changed by fixed increments corresponding to fixed incremental speed changes, so that only one adjustable resistor 93 is required. The resistor 93 may be adjusted by a common setting for all playback speed. Since the parameters of the resonant circuit 75 are similarly switched in a predetermined fashion, the required adjustments for equalizing non-linear responses at any and all playback speeds can effectively be reduced to one adjustment per speed plus one adjustment for the several speeds. The one adjustment per speed may, for instance, be effected by the variable resistor 76 shown in FIG. 1 (in which case there is an individual variable resistor for each speed), while the one adjustment for several speeds may be effected by the single variable resistor 93, also shown in FIG. 1. The variable resistor 91 of FIG. 1 may then be replaced by an individual fixed resistor for each speed. This minimum of adjustments is chiefly due to the partial fraction expansion step of the subject invention, and would not be possible if performance of factorial terms of the equalization without that inventive step were attempted.

The amplifier circuit 88 further includes a lead 95 which connects the top of the resistor 93 to a summing point 96. The voltage applied by the lead 95 to the summing point 96 is governed by the principle expressed above by the equation (7).

The collector circuit output (see FIG. 4) of the amplifier 90 of FIG. 1 is connected by way of a buffer amplifier 98 and a divider 99 to the summing point 96. The buffer 98 is preferably an emitter follower to prevent loading of the amplifier 90 by the divider 99. The divider 99 may be a resistor having a value proportional to the gain constant K.

The effect of the mid-band equalization circuit 88 is shown by the family of curves 101 in the lower-most equalization curve 33 of FIG. 3. The adjustable mid-band equalization circuit adapts the mid-band characteristic of the equalization curve 33 to different playback speeds.

The equalization circuit 88 is supplemented by an equalization circuit 102. The amplifier circuit 102 may be viewed as a low-frequency equalization circuit since it causes the response of the equalization amplifier 20 to roll off at the desired six decibels per octave rate, beginning at the lower band edge frequency $f_1$ shown in FIG. 2.

While the amplifier circuit 88 can thus be viewed as a mid-band equalizer and while the amplifier circuit 102 can be viewed as a low-frequency equalizer, it should be understood that both the amplifier circuit 88 and the amplifier circuit 102, connected in cascade as shown, are necessary to perform the transfer function of equation (4).

The signal provided by the amplifier circuit 88 is applied by a lead 104 to an amplifier 105. The amplifier 105 may be a transconductance amplifier of the type shown in FIG. 4. A resistor 109 is connected to the amplifier 105 to correspond to the resistor 69 shown in FIG. 4. An RC-circuit 106 is connected to the amplifier 105 to correspond to the load impedance 72 shown in FIG. 4. The RC-circuit 106 has a resistor 107 and a parallel-connected capacitor 108. The RC-circuit 106 determines the angular lower band edge frequency as the inverse of the product of the resistance of the resistor 107 and the capacitance of the capacitor 108. The resistance of the resistor 107 may be equal to the resistance of the resistor 109 multiplied by the gain constant K.

A buffer amplifier 110 is connected between the amplifier 105 and a summing point 112 to prevent loading of the RC-circuit 106.

The buffer amplifier 98, ahead of the factor-of-K divider 99, provides at a lead 113 a signal corresponding to the first term on the right side of the equation (4). This term is applied to the summing point 112 by way of a buffer amplifier 114 and a further lead 115. The second term of the right side of the equation (4) is provided by the combined action of the amplifier 90, summing point 96, divider 99, and amplifier 105 with RC-circuit 106, and is applied to the summing point 112 by way of the buffer amplifier 110.

The preferred embodiment of FIG. 1 has a further amplifier circuit 116 for equalizing phase shifts in the played-back signal. The phase equalizer 116 corrects for phase shifts introduced by the amplitude equalizers 43, 88 and 102.

Conventional playback system phase equalization technique, as well as practical tests and a computer analysis, suggested that phase equalization should be effected with reference to a frequency $f_3$ having a value larger than that of $f_2$ and smaller than that of $f_4$. In terms of the frequency band from $f_1$ to $f_4$, a practical location for $f_3$ is at about two-thirds to three-quarters of that band.

By way of further computer analysis and experimental verification, it has been found that the equation (1) should be supplemented by the following factor or factorial term to provide for the desired phase equalization:

$$(\omega_3 - j\omega)/(\omega_3 + j\omega) \qquad (12)$$

wherein $\omega$ is the angular frequency of the played back signal; $\omega_3$ is the angular counterpart of the phase equalization frequency $f_3$; and $j$ is the imaginary unit.

Pursuant to the subject invention, the factorial term (12) is subjected to partial fraction expansion to provide $[2\omega_3/(\omega_3+j\omega)]-1$ in accordance with which the phase equalizer 116 performs a function conforming to the factorial term (12) for correcting phase shifts. To this end, the equalizer 116 includes an amplifier 118 which has its input connected to the summing point 112 and which may be a transconductance amplifier of the type shown at 54 in FIG. 4.

The load of the amplifier 118, which corresponds to the load 72 shown in FIG. 4, is an RC-circuit 118' composed of a resistor 119 and a parallel-connected capacitor 120. The angular phase equalization frequency $\omega_3$ is equal to the inverse of the product of the resistance of resistor 119 and the capacitance of capacitor 120. Since $f_3$ or $\omega_3$ varies with tape speed, it is necessary to change the time constant of the RC-circuit 118' for each change in tape speed. This may, for instance, be effected by substantially doubling the capacitance of capacitor 120 for each reduction of the tape speed by a divisor of two. The value of resistor 119 may then be fixed.

The voltage provided across the load impedance 118' is applied by a buffer amplifier 122 to a summing point 123. The amplifier 118 applies to the summing point 123 by way of a lead 124 a voltage corresponding to the sum of the voltages received by the summing point 112.

The signal produced at the summing point 123 is amplitude and phase equalized in accordance with the transfer function according to equation (1) when supplemented by the factorial term (12). An ideal phase equalization is shown by the straight curve 31 in FIG. 2.

The equalized signal derived from the summing point 123 is amplified by an intermediate amplifier 125. The amplifier 125 may be a conventional two-stage direct-coupled amplifier, which may have an alternating-current negative feedback for increased stability. The amplified equalized signal is applied to a level control 126 which permits adjustment of the signal voltage within a desired range.

The level-controlled signal is applied to an output amplifier 128 which may also be a conventional type and which may include a push-pull stage. The fully equalized and amplified signal appears at an output 131 and may from there be applied to any equipment (not shown) for further processing the reproduced signal or for rendering the same discernible by the senses. For instance, in the case of an audio recorder, the equalized and amplified signal played back from the tape 12 may be applied to a loudspeaker system. In the case of instrumentation recorders, the equalized and amplified played-back signal may, for instance, be applied to an oscillograph, to a printer, or to a computer memory and the like.

A circuit diagram of an equalizing playback amplifier in accordance with a preferred embodiment of the subject invention is shown in FIGS. *5a* and *b.* The circuitry of these figures follows the block diagram of FIG. 1. Like reference numerals as among FIGS. 1, *5a* and *5b* designate like or functionally equivalent circuits or parts.

The played-back and preamplified information signal is applied by way of the equalization amplifier 18 and a coupling capacitor 141 to a bias trap 142. The bias trap is a conventional parallel resonant circuit which prevents passage of played-back high-frequency bias into the equalizing amplifier. The previously disclosed potentiometer 41 is connected to the bias trap 142 for input voltage adjusting purposes. The level-adjusted played-back signal is applied to the above mentioned input 42 of the high frequency equalization amplifier 43. The above mentioned lead 45 applies that signal to the summing point 46 by way of a summing resistor 144.

In the preferred embodiment of FIG. *5a,* the amplifier 51 is composed of transistors 61 and 145 connected to provide a two-stage direct-current amplifier. The amplifier 51 has an alternating-current negative feedback 146 for increased stability.

The above mentioned resonant circuitry 75 is connected by a lead 147 to the amplifier 51 as a collector load of the transistor 145. In accordance with the above disclosure, the resonant circuitry 75 increases the response of the tuned amplifier 51 at frequencies near the upper band edge. Since the requisite upper band edge enhancement is different for different speeds, it is necessary to switch the resonant frequency of the circuitry 75 in accordance with speed changes.

The preferred embodiments of the subject invention may be implemented for two-speed playback systems or for systems having many different playback speeds ranging from less than one inch per second to more than 200 inches per second. For the purpose of simplicity, a playback system with only four different speeds has been shown in FIGS. 5*a* and *b*. As indicated by way of example near the left margin of FIG. 5*a*, the equalizing amplifier of FIGS. 5*a* and *b* has been shown for a first playback tape speed of *v*, a second playback speed of 2*v*, a third playback speed of 4*v*, and a fourth playback speed of 8*v*. Prototypes of the system of FIGS. 5*a* and *b* capable of equalizing non-linear frequency responses at playback speeds from *v* to as high as 256*v* have been built and successfully tested.

Adaptation of the equalizing amplifier of FIGS. 5*a* and *b* to the various playback speeds is easily effected by a switch 150 which has a sliding arm 151 that engages a different switching line 152, 153, 154 or 155 for each specific playback speed.

Each of the switching lines 152 to 155 has a different switching transistor 158, 159, 160 or 161 connected thereto as shown. Each switching transistor has a resonant circuit 163, 164, 165 or 166 connected thereto. In this manner, the resonant circuit 166 is effective as a load of the amplifier 51 at the playback speed *v*, and the resonant circuit 165 is effective as a load at the playback speed 2*v*. Similarly, the resonant circuit 164 is effective as a load of the amplifier 51 at the playback speed of 4*v*, and the resonant circuit 163 is effective as a load at the playback speed of 8*v*. It will be noted that the resonant circuits 163 to 166 do not require individually adjusted parts. Rather, the values of their components are fixed in accordance with the particular speeds and the resonant circuits are simply switched for the various speeds without the necessity of individual adjustment.

The high frequency gain adjustment 76 (see FIG. 1) is provided in the embodiment of FIG. 5*a* by variable resistors 171, 172, 173, 174, which are selectively switched in accordance with the prevailing playback speed by a series of switching transistors 176, 177, 178, 179 connected to the speed switching lines 152 to 155 as shown. A lead 181 connects the resistors 171 to 174 to the emitter of the transistor 145, by way of a coupling capacitor 182.

It is a remarkable fact that the high frequency gain adjustment 76 is the only adjustment of the complex apparatus of FIGS. 5*a* and *b* that has to be individually effected for each speed. These individual adjustments are readily effected during the start-up of the system by adjusting the variable resistors 171 to 174 for optimum high frequency equalization performance of the system for each speed. The signal occurring at the output 184 of the tuned amplifier 51 is applied by way of a buffer amplifier 52 and a summing resistor 185 to the summing point 46. The buffer amplifier 52 is an emitter follower which prevents undue loading of the resonant circuits 163 to 166.

In accordance with the preferred embodiment illustrated in FIG. 5*a*, the high frequency gain adjustments effected by the variable resistors 171 to 174 are realized by controlling the amount of alternating-current bypass around the emitter resistor 187, with the aid of a resistor 188 connected between the lead 186 and the positive supply voltage bus 189.

In accordance with the block diagram of FIG. 1, the input of the amplifier 90 of the mid-band equalization circuit 88 is connected to the summing point 46. The amplifier 90 of FIG. 5*a* is composed of two transistors 191 and 192 which are connected to form a two-stage direct-coupled amplifier. The amplifier 90 has an alternating-current negative feedback circuit 194. The mid-band gain adjustment equipment 91 comprises in the embodiment of 5*a* a fixed individual resistor 200, 201, 202 or 203 for each speed. Switching transistors 205, 206, 207 and 208 are controlled by way of the switching lines 152 to 155 to select the appropriate one of the resistors 200 to 203 in accordance with the prevailing playback speed.

In accordance with an important feature of the illustrated preferred embodiment, the resistors 200 to 203 are fixed and need not be individually adjusted. Rather, they are switched in accordance with the selected playback speeds to form appropriate collector resistors for the transistor 192.

Figure 5B:
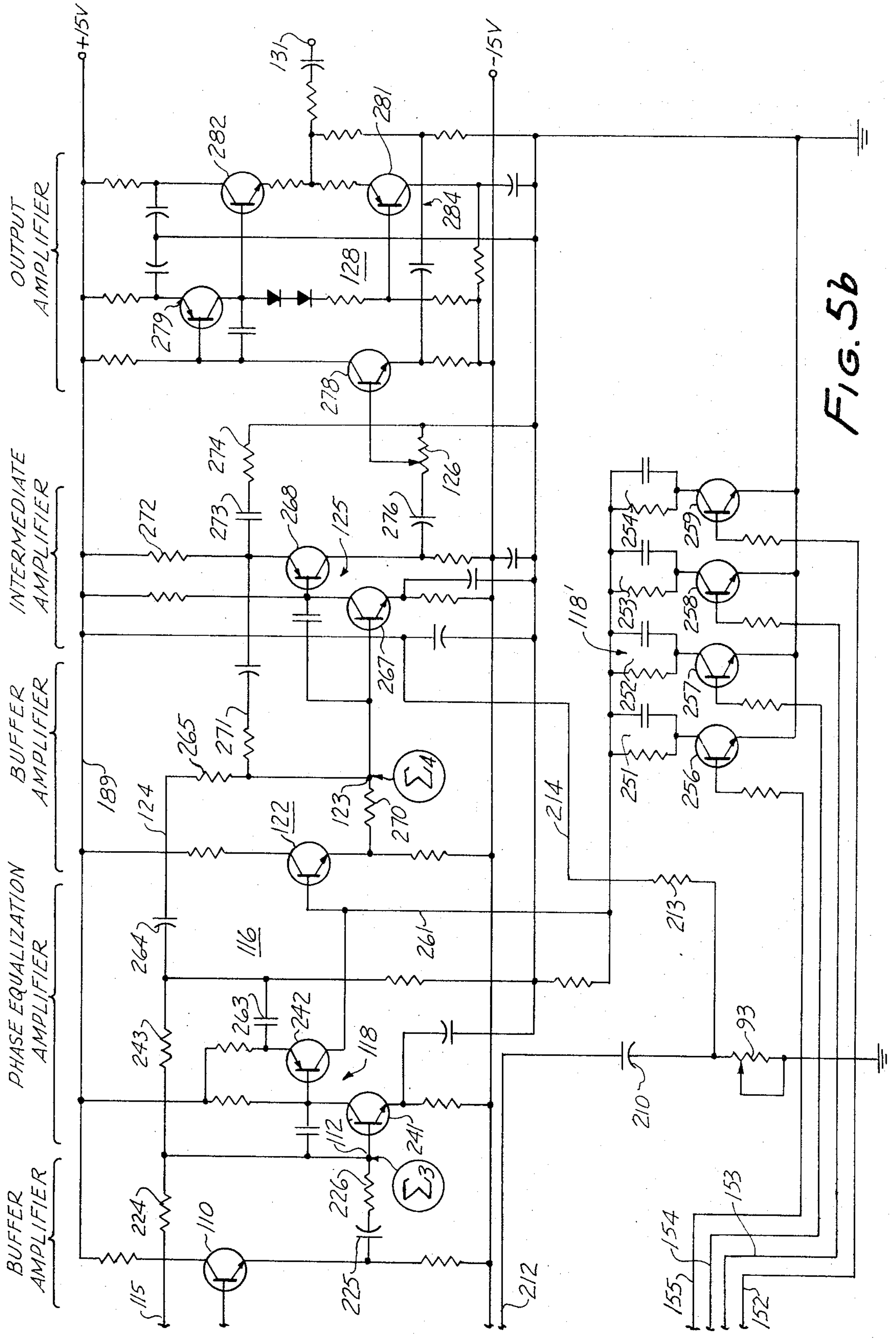

The previously disclosed variable mid-band gain adjustment resistor 93 (see FIG. 1) is connected to the emitter of the transistor 92 by way of a coupling capacitor 210 and a lead 212. The variable resistor 93 is also connected to the positive supply bus 189 by a resistor 213 and a lead 214. The buses 189 in FIGS. 5*a* and 5*b* are in practice connected to the same positive current supply terminal, so that the lead 214 is effectively connected to the top of the emitter resistor 215 of the transistor 192. In this manner, the variable resistor 93 controls the amount of alternating-current bypass around the emitter resistor 215.

It is an important feature of the illustrated preferred embodiment of the invention that the variable resistor 93 can be pre-adjusted for all playback speeds. The adjustment of the variable resistors 171 to 174 is thus the only adjustment that has to be effected individually for each tape speed.

The emitter of the transistor 192 is connected by a coupling capacitor 217, by the above mentioned lead 95, and by a summing resistor 218 to the summing point 96. The output signal of the amplifier 90 is applied to the summing point 96 by way of the above mentioned buffer amplifier 98, which in FIG. 5*a* has the form of an emitter follower, and the above mentioned divider 99. In the preferred embodiment of FIG. 5*a*, the divider 99 is a resistor which reduces the amplitude of the signal provided by the amplifier 90 by a factor corresponding to the inverse of the gain constant K.

The above mentioned buffer amplifier 114 (see FIG. 1) is also in the form of an emitter follower and is controlled by the voltage developed across the collector resistors 220 and 221 of the buffer amplifier 98. The emitter output voltage developed by the buffer amplifier 114 is applied to the above mentioned summing point 112 by way of a coupling capacitor 223, the above mentioned lead 115, and a resistor 224.

The input of the amplifier 105 is connected to the summing point 96. The amplifier 105 is in FIG. 5*a* composed of a pair of transistors 231 and 232 connected to form a two-stage direct-coupled amplifier. The amplifier 105 has an alternating-current negative feedback circuit 233.

The above mentioned RC-circuit 106, with its resistor 107 and capacitor 108, is connected to the collector of the transistor 232. As mentioned above, the circuit 106 determined the lower band edge frequency. The components of the circuit 106 need not be adjustable since the lower band edge frequency need not be variable as a function of playback speed.

The output of the amplifier 105 is applied by way of the above mentioned buffer amplifier 110, a capacitor 225, and a resistor 226 to the summing point 112.

The signal developed at the summing point 112 is applied to the input of the amplifier 118 of the phase equalization circuit 116. Phase equalization in the preferred embodiment of FIGS. 5*a* and *b* is provided to ensure a substantially linear phase response with respect to frequency so that the relative timing of complex waveform harmonics with respect to the fundamental is not disturbed.

The amplifier 118 comprises a pair of transistors 241 and 242 connected to form a two-stage direct-coupled amplifier. The amplifier 118 has an alternating-current negative feedback circuit 243. The RC network 118' (see FIG. 1) in the embodiment of FIG. 5*b* is composed of four RC circuits 251 to 254. A number of switching transistors 256 to 259 are controlled by the speed switching lines 152 to 155 in order to effectively connect the appropriate one of the circuits 251 to 254 to the collector of the transistor 242 by way of a lead 261. The resistors of the circuits 251 to 254 are fixed and have the same value among the four circuits. The capacitors of the circuits 251 and 254 are also fixed. The capacitance of the capacitor of the circuit 252 is about twice the capacitance of the capacitor of the circuit 251. Similarly, the capacitance of the capacitor of the circuit 253 is about twice the value of the capacitance of the capacitor of the circuit 252, and the capacitance of the capacitor of the circuit 254 is about twice as high as the capacitance of the capacitor of the circuit 253.

It is another remarkable fact of the subject invention that the phase equalization circuits are only switched with speed, but need not be individually adjustable.

The output signal of the amplifier 118 is applied to the summing point 123 by the above mentioned buffer amplifier 122 and a resistor 270. A signal is also derived from the emitter of transistor 242 and is coupled to the summing point 123 by a capacitor 263, a capacitor 264, the above mentioned lead 124, and a summing resistor 265.

The above mentioned intermediate amplifier 125 is in FIG. 5b composed of a pair of transistor 267 and 268 connected to form a two-stage direct-coupled amplifier. The amplifier 125 has an alternating-current negative feedback circuit 271. The emitter resistor 272 of the transistor 268 is alternating-current bypassed by a capacitor 273 and a resistor 274.

A capacitor 276 applies the output signal of the intermediate amplifier 125 to the variable potentiometer 126 with which the level of the played-back signal may be adjusted. The wiper of the potentiometer 126 is connected to the input of the output amplifier 128.

The output amplifier 128 comprises a pair of transistor 278 and 279 connected to form a two-stage direct-current amplifier. The output amplifier 128 also includes a pair of output transistors 281 and 282 connected to form a complementary symmetry push-pull amplifier stage connected to and driven by the transistors 278 and 279 as shown. The output of the push-pull stage is coupled to the systems output 131. A negative feedback circuit 284 assures stable operation of the output amplifier.

The signal appearing at the systems output 131 of FIG. 5b contains the played-back information and is equalized as to amplitude and phase non-linearities for any playback speed.

The above mentioned gain constant K is determined by the value of the output voltage of the head 13. In a prototype of the apparatus shown in FIGS. 5*a* and *b*, K was made equal to 100 for a preamplifier gain of 200 and a line driver gain of 10.

The above mentioned damping constant $d_1$ is determined by the curvature of the voltage/frequency characteristic of the playback head 13. A practical value for $d_1$ in the case of instrumentation-type playback heads is 0.2.

The above mentioned variables $f_2$ and $d_2$ are functions of the width of the gap 14 of the playback head 13. Since that gap width is a controlled parameter, the variations of $f_2$ and $d_2$ typically are not large.

A prototype of the embodiment shown in FIGS. 5*a* and *b* has been built and successfully tested for recording signal frequencies of from 50Hz to 2MHz.

I claim:

1. A method of equalizing a non-linear frequency response of a recorded signal playback system, comprising in combination the steps of:
- providing an equalizing function for an equalization of said non-linear frequency response;
- analyzing said equalizing function into a number of factorial terms;
- performing a partial fraction expansion on each term;
- providing for each of said factorial terms a means for performing in accordance with the particular partial fraction expansion a function conforming to the particular factorial term;
- cascading the number of means so provided;
- playing back with said playback system said recorded signal as a corresponding electric signal; and
- subjecting said played-back electric signal to said cascaded number of means whereby to equalize said non-linear frequency response.

2. A method as claimed in claim 1, wherein:
- said playback system is a multi-speed playback system; and
- parameters of said function-performing means are switched for each speed of the playback system to adapt the equalization of said non-linear frequency response to the particular speed.

3. A method as claimed in claim 2, wherein:
- a parameter of one of said function-performing means is adjusted for each playback system speed to adapt the equalization of said non-linear frequency response to each playback system speed.

4. A method as claimed in claim 1, wherein:
- said non-linear frequency response substantially is a non-linear amplitude-versus-frequency response;
- said equalizing function is provided by providing an equalizing function for said non-linear amplitude-versus-frequency response;
- said equalizing function is analyzed into a number of factorial amplitude equalization terms;
- a partial fraction expansion is performed on each factorial amplitude equalization term;
- a means is provided for each of said factorial amplitude equalization terms for performing in accordance with the particular partial fraction expansion a function conforming to the particular factorial amplitude equalization term;
- said equalizing function is provided with a further factorial term for correcting phase shifts introduced by said function-performing means;

a partial fraction expansion is performed on said further factorial term;

a further means is provided for performing in accordance with the partial fraction expansion performed on the further factorial term a function conforming to said further factorial term for correcting said phase shifts;

the number of amplitude equalization means and the phase shift correcting means are cascaded; and said played-back electric signal is subjected to said cascaded amplitude equalization means and phase shift correcting means whereby to equalize said non-linear frequency response and correct said phase shifts.

5. A method as claimed in claim 4, wherein:

said playback system is a multi-speed playback system;

parameters of said amplitude equalization means are switched for each speed of the playback system to adapt the equalization of said non-linear frequency response to the particular speed.

6. A method as claimed in claim 5, wherein:

a parameter of said phase shift correcting means is switched for each speed of the playback system to adapt the correction of said phase shifts to the particular speed.

7. A method as claimed in claim 6, wherein:

a parameter of one of said amplitude equalization means is adjusted for each playback system speed to adapt the equalization of said non-linear frequency response to each playback system speeds.

8. In apparatus for playing back recorded signals and equalizing a non-linear frequency response of the playback with the aid of an equalizing function for an equalization of the non-linear frequency response, the improvement comprising in combination:

means for playing back said recorded signals in the form of corresponding electric signals;

a number of cascaded means for performing said equalizing function on said electric signals, said number of cascaded means including first means for performing on said electric signals a function conforming to a first factorial term of said equalizing function, and second means connected in cascade with said first means for performing a function conforming to a second factorial term of said equalizing function, said first means including third means for performing on said electric signals a function conforming to a first term of a partial fractional expansion of said first factorial term, and fourth means connected to said third means for performing on said electric signals a function conforming to a second term of said partial fractional expansion of said first factorial term, and said second means including fifth means for performing a function conforming to a first term of a partial fractional expansion of said second factorial term, and sixth means connected to said fifth means for performing a function conforming to a second term of said partial fractional expansion of said second factorial term; and means connected between said playback means and said number of cascaded means for applying said played-back electric signals to said number of cascaded means whereby said non-linear frequency response is equalized.

9. An apparatus as claimed in claim 8, wherein:

said playback means include multi-speed playback means for playing back recorded signals in the form of corresponding electric signals at different playback speeds; and said first and second means include selectively actuable means for adapting the equalization of said non-linear frequency response to each playback speed.

10. An apparatus as claimed in claim 9, wherein:

said selectively actuable adapting means include selectively actuable resonant circuit means.

11. An apparatus as claimed in claim 9, wherein:

said selectively actuable adapting means include means for adjusting the equalization of said non-linear frequency response for each playback speed.

12. An apparatus as claimed in claim 9, wherein:

said selectively actuable adapting means include selectively actuable RC circuit means.

13. An apparatus as claimed in claim 9, wherein:

said cascaded means include means tending to introduce phase shifts in said electric signals;

said apparatus includes seventh means cascaded with said first and second means for correcting said phase shifts in said electric signals; and said seventh means include selectively actuable means for adapting the correction of said phase shifts to each playback speed.

14. An apparatus as claimed in claim 13, wherein:

said phase shift correction means include selectively actuable RC circuit means for adapting the correction of said phase shifts to each playback speed.

15. An apparatus as claimed in claim 14, wherein:

said selectively actuable adapting means include selectively adjustable means for adjusting the equalization of said non-linear frequency response for each playback speed.

16. An apparatus as claimed in claim 8, wherein:

said playback system is a multi-speed playback system;

one of said function-performing means includes transconductance amplifier means having a selectively actuable load impedance and having a selectively actuable further impedance, separate from said load impedance, for adapting the equalization of said non-linear frequency response to each playback speed.

17. An apparatus as claimed in claim 16, wherein:

said load impedance includes selectively actuable resonant circuit means for adapting the frequency characteristic of the upper part of said non-linear frquency response to each playback speed.

18. An apparatus as claimed in claim 17, wherein:

said further impedance includes selectively actuable gain adjustment means for adapting the gain of the upper part of said non-linear frequency response to each playback speed.

19. An apparatus as claimed in claim 18, wherein:

another of said function-performing means includes a second transconductance amplifier means having a second selectively actuable load impedance, and having a second selectively actuable further impedance, separate from said second load impedance, for adapting the equalization of said non-linear frequency response to several playback speeds.

* * * * *